UNITED STATES PATENT OFFICE.

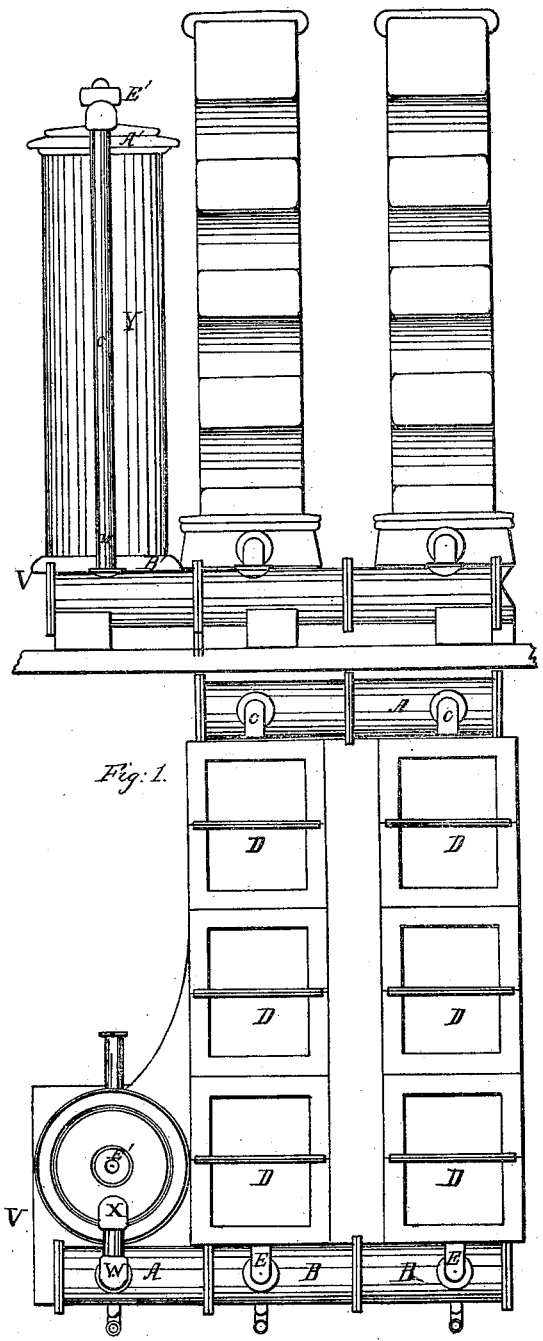

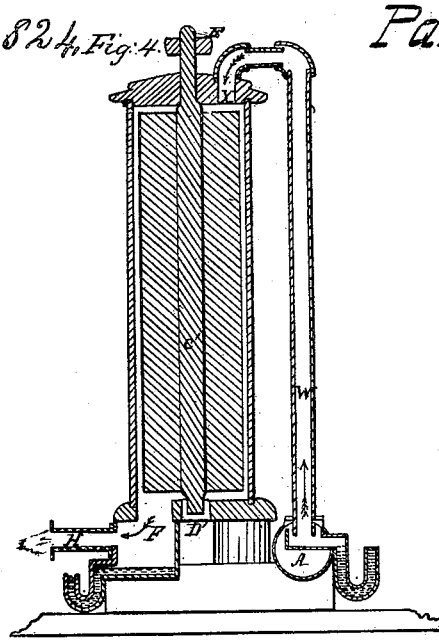
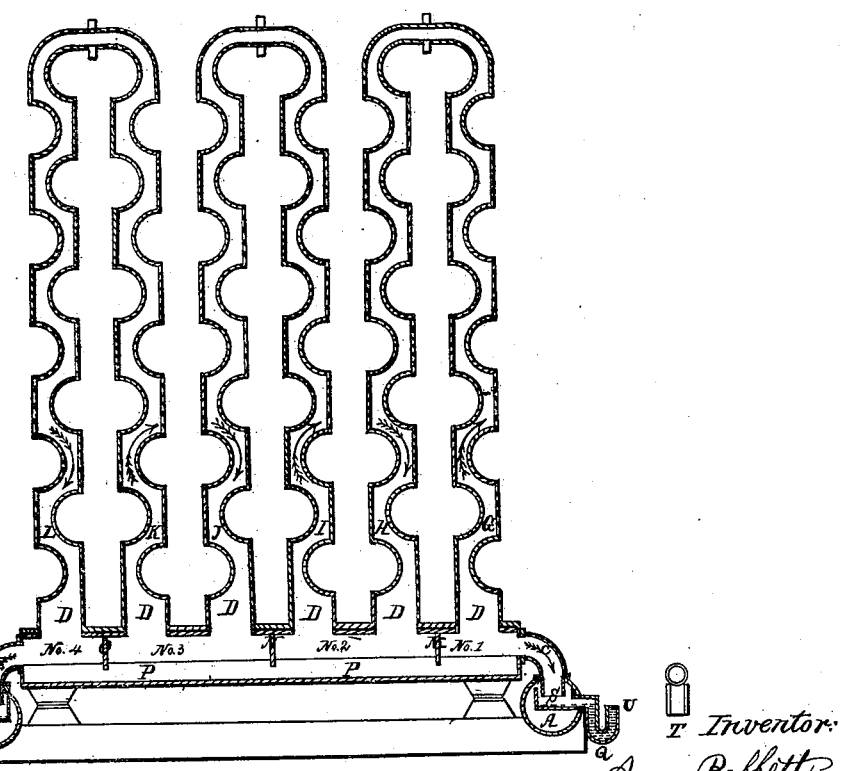

AVERY BABBETT AND WILLIAM W. BINNY, OF AUBURN, N. Y., ASSIGNORS TO THEMSELVES AND SOLOMON N. BIERCE, OF NEW YORK CITY.

IMPROVEMENT IN CONDENSERS FOR THE MANUFACTURE OF COAL-GAS.

Specification forming part of Letters Patent No. 103,824, dated June 7, 1870.

We, AVERY BABBETT and WILLIAM W. BINNY, both of the city of Auburn, in Cayuga county, New York, have invented certain Improvements in Coal-Gas Condensers, whereby the work of condensation is more completely effected at 150° Fahrenheit and the gas left at a much higher illuminating power than when the same is condensed at from 60° to 70° Fahrenheit in the present mode.

Before stating in what our invention consists, it is proper to remark here that proper condensation consists in the removal from the gas of all substances produced in distillation which, for some reason, are not useful for the purpose of illumination, and the retention in the gas of all the substances which are useful as illuminants and which can be distributed with the gas. Water and most of the compounds which it holds in solution are useless, and cannot be distributed. These therefore should be removed. The heaviest hydrocarbons (tar) are useful as illuminants, but cannot be distributed, and therefore they should be removed; but the gases and the lighter hydrocarbon vapors are useful, and can be distributed, and therefore no more of these should be removed than is absolutely necessary to effect a proper removal of those compounds which must be removed because they are useless as light-givers or cannot be distributed.

Of all substances the most useful as light-givers when burned with gas are the vapors of hydrocarbons, and therefore every pains should be taken to keep in the gas the largest possible quantity of these vapors, and whenever the crude gas is brought down to the temperature of 60° to 70° Fahrenheit in straight condenser-pipes these heavy hydrocarbons, which cannot be distributed with the gas, carry down with them much of the lighter kinds, and they are entirely lost as illuminants in the present mode. The crude gas, as it leaves the hydraulic main, is made up of gases, vapors, and fluids. The fluids are chiefly the heavy hydrocarbons, and are found in small globules or spheres, inclosing hydrogen gas. The specific gravity of the gas being so much less than the tar encircling it, it causes both to float along the current at various altitudes just in proportion to the sum of these differences. The coal-tar, which forms the covering to these globules, never would leave the retort unless borne up by a counterpoising influence greater than the sum of the gravitating force of the tar and gas of which they are composed. To break these globules and set free the hydrogen gas is the first and vastly the most important part of condensation.

It is obvious that the hydrogen gas cannot take up or carry with it the hydrocarbon vapors so long as it is inclosed in this tar covering; but as soon as it is set free its affinity for these vapors causes it to absorb them, and to the full extent of its capacity. These globules should be broken while the volume of crude gas in which they are floating is at a temperature of 150° to 180° Fahrenheit, and while the hydrocarbon vapors are the most active in diffusing themselves with and are the most easily and completely absorbed by the hydrogen gas.

In what manner and under what circumstances this is accomplished will be explained in what follows.

Nature and Objects of the Invention.

The first part of our invention relates to the peculiar construction of our condensing pipes or cases, through which we pass the gas for the purpose of condensing the same; and it consists in two sinuous vertical cases, joined at the top and opening into and resting upon the tar-well at the bottom, (these may be duplicated to any extent to give capacity,) having for the cross-section of the space an oblong square, the shortest side of which not to exceed more than three inches, for the passage of the gas in each, which enters at the lower end of one and passes to the top, where it enters the other, comes down it, and passes out at the lower end, both columns so constructed as to deflect the current of gas right and left sufficiently from a vertical line taken through the center of each column to allow the greater momentum and gravitating force of the heaviest particles thereof to float out from the main current as it bends around the curves in the condenser-pipes, and become attached to the inside of the case, which breaks the globule, (the tar covering,) from thence floating down the side of the case to the tar-well, and at the same time setting free the hydrogen gas.

The second part of our invention relates to a centrifugal condenser—that is, by rapidly revolving a column of gas those properties having the greatest specific gravity are driven out from the main column by the centrifugal force generated by the revolving column and deposited on the inside of the case, where the same results follow as in the case of the sinuous condenser above mentioned.

The third part of our invention relates to the application of our condenser to large works, where millions of cubic feet are made and consumed daily.

In making this application it should be borne in mind that one of the indispensable conditions in the successful application of this condenser to any works is the necessity of passing the gas through in thin sheets, so that the gravitating force and momentum acting upon the heaviest portion shall not be required to move the same but a small distance in order to dash the globules upon the side of the condensing-pipes.

If we make the space in the condensing-column over three inches thick, its condensing power would be greatly diminished thereby, because the heaviest portions would have so far to travel before striking the side of the condenser that many would pass quite through the condensing-pipes without coming in contact with the side of the condenser, and the condensation would be made imperfect thereby.

Now, if we make the horizontal cross-section of the space three by thirty-six inches, it would be about as large as it would be practical to make it. This would pass ten thousand cubic feet per hour. In order to apply this kind of condenser to large works, it will become necessary to duplicate the series of columns in order to make room to pass the required amount in such manner that any one or more of the series may be cut off from the inlet and outlet main without in any way disturbing the normal action of the others. We accomplish this by fixing a water-seal between the inlet-main and the condenser and between the outlet-main and condenser, which entirely closes any one of the series of condenser-pipes, so they may be repaired at leisure.

*Description of Drawing.*

Figure 1 is a plan of two condensers, one the centrifugal and two series of the sinuous. Fig. 2 is an elevation of the front of both. Fig. 3 is a vertical longitudinal section, showing the inlet and outlet mains. The brush or pencil shading shows the gas, the darts the direction in which it moves and where it enters and leaves the condensers. Fig. 4 is a vertical section of the centrifugal condenser. Fig. 5 is a horizontal cross-section of the same, taken through the center of the condensing column or cylinder.

A is the inlet-main, and includes two joints like the outlet main. B is the outlet-main, and receives the gas from the condenser and transmits it to the pipes leading to the purifiers. C C are pipes conveying the gas into the sinuous condensers D D D D D. E E are outlet-pipes from the condenser. They convey the gas from the condenser to the outlet-main B.

The pipes leading from the hydraulic main to the inlet-main and from the outlet-main to the purifiers are not shown, because they are no part of our invention.

The gas enters the inlet-main A, and from thence passes up the pipes C C into the tar-well No. 1, on which the condenser-pipe G rests; from thence up the pipe G to the top, where it enters the pipe H. From thence it passes down to the tar-well No. 2. This tar-well opens into the pipe I, up which it passes to the pipe J at the top; from thence down into the tar-well No. 3; from thence up the pipe K and down the pipe L into the tar-well No. 4; and from thence through the pipe E into the outlet-main B.

The tar-wells are separated by partitions M N O, extending down into the tar P at the bottom. (Shown in dotted lines.) These partitions separate the sinuous pipes in such manner that the gas passes up the first, third, and fifth and down the second, fourth, and sixth. The columns may be constructed of any size or in any number to suit the required demand.

Q and R are tar-drips opening into the water-seals S S. By screwing the short piece of pipe T on the top of the tar-drip U, water may be flowed into the seals S S until it comes above the lower end of the pipes C and E within the inlet and outlet mains. This cuts off this series from the mains for any purpose desired. This operation may be performed at any time, and while the other series are in full operation. The series thus cut off may be taken down, cleaned or repaired, and replaced while the others are in full operation quite as well as if the gas was entirely excluded from all the series.

The plan of the centrifugal condenser is shown at V, Fig. 1; a front view or elevation, V, Fig. 2; and a complete vertical section at Fig. 4.

W is the inlet-pipe, issuing from the inlet-main A and entering the top of the case at X. Y is the case, circular in form, having a cap, A', at the top, and resting upon a closed cap, B', at the bottom. The shaft C' runs in the box D' at the lower end, and extends up through the cap A' at the top of the cylinder, and has a pulley, E', keyed to the top, to which the revolving power is applied. The shaft C' has wings radiating from it. They are shown more fully at Fig. 5, in which C' is the shaft, and 1 2 3 4 5 6 7 8 9 10 11 are the wings. The gas enters the condenser through the pipe W from the inlet-main A, and passes through it and enters the top of the condenser at X. From thence it passes down through the spaces between the wings 1 2 3, &c., to the tar-well F', and from thence on through the pipe H' to the purifiers.

Now, when the shaft C', with the wings above described, is made to revolve, filled with crude gas, the heaviest portions thereof will be floated outward and become attached to the inside of the condenser-case by the centrifugal force generated by the revolving currents flowing down between the wings, and from thence will flow down to the tar-well beneath.

The object of the curves in the sinuous condenser-cases is for the purpose of throwing off the heavier particles from the main current by means of their greater momentum and specific gravity. Another is to break the almost infinite number of the small globules mentioned above, and to effect a complete and continuous intermingling, stirring, and mixing up of the whole mass of crude gas, the heavier with the lighter particles of the hydrocarbons, in order that the hydrogen gas may absorb, take up, and carry with it the largest possible amount of these vapors, for in the proportion as it absorbs these does the gas become illuminating or otherwise.

The object of separating the currents and running each through separate cases is for the purpose of preventing the heat from radiating from one case to the next, and so on. Where the currents all flow through a case made of one piece of metal the temperature of the whole soon becomes nearly uniform; but where the cases are made separate the outlet-columns are merely above a sensible heat.

We claim as our invention—

1. Passing the crude gas through a series of sinuous vertical cases for the purpose of condensing the same, as above set forth.

2. The inlet and outlet mains, in combination with a series of sinuous condensers, as and for the purpose specified.

3. The hydraulic seals S S, between the inlet and outlet mains, in combination with the sinuous condenser-cases, for the purpose and in the manner above set forth.

4. The application and use of a revolving column or columns of gas for the purpose of expelling therefrom the non-illuminating properties by means of the centrifugal force generated thereby, substantially as above described.

AVERY BABBETT.
WILLIAM W. BINNY.

Witnesses:
P. HIELSEY,
C. A. BROWN.